United States Patent
Metwaly Saad et al.

(10) Patent No.: US 12,294,870 B2
(45) Date of Patent: May 6, 2025

(54) TECHNIQUES FOR IDENTIFYING BLOCKAGES BETWEEN DEVICES

(71) Applicant: QUALCOMM Incorporated, San Diego, CA (US)

(72) Inventors: Hussein Metwaly Saad, San Diego, CA (US); Peerapol Tinnakornsrisuphap, San Diego, CA (US); Tom Edward Botterill, San Diego, CA (US); Ravi Agarwal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 552 days.

(21) Appl. No.: 17/537,242

(22) Filed: Nov. 29, 2021

(65) Prior Publication Data

US 2023/0171610 A1    Jun. 1, 2023

(51) Int. Cl.
*H04W 16/28* (2009.01)
*G06T 7/70* (2017.01)
*G06V 20/20* (2022.01)
*H04W 72/044* (2023.01)

(52) U.S. Cl.
CPC .............. *H04W 16/28* (2013.01); *G06T 7/70* (2017.01); *G06V 20/20* (2022.01); *H04W 72/046* (2013.01)

(58) Field of Classification Search
CPC ...... H04W 16/28; H04W 72/046; G06T 7/70; G06V 20/20
See application file for complete search history.

(56) References Cited

U.S. PATENT DOCUMENTS

| 2005/0058151 | A1* | 3/2005 | Yeh | H04W 52/46 370/445 |
| 2011/0105045 | A1* | 5/2011 | Tanaka | H04W 72/046 455/67.11 |
| 2018/0146419 | A1* | 5/2018 | Raghavan | H04W 48/16 |
| 2018/0191422 | A1* | 7/2018 | Xia | H04W 72/21 |

(Continued)

FOREIGN PATENT DOCUMENTS

| WO | WO-2018064483 A1 * | 4/2018 |
| WO | WO-2021084592 A1 | 5/2021 |

OTHER PUBLICATIONS

International Search Report and Written Opinion—PCT/US2022/079876—ISA/EPO—Feb. 15, 2023.

*Primary Examiner* — Jael M Ulysse
(74) *Attorney, Agent, or Firm* — Holland & Hart LLP

(57) ABSTRACT

Methods, systems, and devices for wireless communications are described. A user equipment (UE), such as a UE associated with an extended reality (XR) device, may obtain frame data from one or more cameras associated with the UE. The UE may determine a path of a beam providing communication between the UE and a base station, determine a location of a base station in communication with the UE, or both, where the base station location may be relative to a location of the UE. The UE may identify, based on the frame data, the path of the beam, the base station location, the UE location, or a combination thereof, a physical blockage to the communication. The UE may perform beam management for the communication based on identifying the physical blockage, so as to mitigate the impact the physical blockage may have on the communications between the UE and the base station.

30 Claims, 10 Drawing Sheets

(56) References Cited

U.S. PATENT DOCUMENTS

| | | | |
|---|---|---|---|
| 2018/0199349 A1* | 7/2018 | Hehn | H04W 8/005 |
| 2018/0288755 A1* | 10/2018 | Liu | H04W 56/0015 |
| 2018/0288756 A1* | 10/2018 | Xia | H04W 16/28 |
| 2019/0068926 A1* | 2/2019 | Vu | H04L 65/80 |
| 2019/0159038 A1* | 5/2019 | Xu | H04W 74/0808 |
| 2019/0222279 A1* | 7/2019 | Xi | H04B 7/0617 |
| 2019/0261193 A1* | 8/2019 | Torsner | H04W 24/10 |
| 2019/0320336 A1* | 10/2019 | Takano | H04W 16/28 |
| 2020/0037301 A1* | 1/2020 | Park | H04B 7/08 |
| 2020/0127907 A1* | 4/2020 | Koo | H04W 24/02 |
| 2020/0275402 A1* | 8/2020 | Shi | H04W 76/11 |
| 2020/0328797 A1* | 10/2020 | Gajula | H04B 7/0695 |
| 2020/0382187 A1* | 12/2020 | Brunel | H04B 7/0695 |
| 2021/0184748 A1* | 6/2021 | Luo | H04W 52/143 |
| 2021/0192769 A1* | 6/2021 | Lee | G06T 19/006 |
| 2021/0385847 A1* | 12/2021 | Kang | H04L 1/0026 |
| 2022/0014933 A1* | 1/2022 | Moon | H04W 16/225 |
| 2022/0038157 A1* | 2/2022 | Ali | H04B 17/309 |
| 2022/0039081 A1* | 2/2022 | Liu | H04W 4/027 |
| 2022/0166484 A1* | 5/2022 | Go | H04L 5/0051 |
| 2022/0225118 A1* | 7/2022 | Pefkianakis | H04W 64/006 |
| 2022/0225121 A1* | 7/2022 | Wanuga | H04L 5/0048 |
| 2022/0229187 A1* | 7/2022 | Chai | G01S 17/87 |
| 2023/0024769 A1* | 1/2023 | Kishorbhai Sanchaniya | G06V 20/54 |
| 2023/0044590 A1* | 2/2023 | Pefkianakis | H04B 7/088 |
| 2023/0337269 A1* | 10/2023 | Rao | H04B 7/0695 |
| 2023/0412236 A1* | 12/2023 | Kalantari | H04B 7/088 |

\* cited by examiner

TECHNIQUES FOR IDENTIFYING BLOCKAGES BETWEEN DEVICES

FIELD OF TECHNOLOGY

The following relates to wireless communications, including techniques for identifying blockages between devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, devices may communicate with one another using beams (e.g., beamforming). In some cases, beams may be highly directional, and accordingly, two devices in communication with one another may select a beam pair to perform such communications. However, in some cases, one or more factors of the communication environment may change. For example, an object may move, one or more of the devise may move, or a combination thereof such that the beam pair is impacted. For example, an object may block the current beam pair the devices are using to communicate. Techniques for mitigating the effects that environmental factors may have on communications between devices may be improved.

SUMMARY

The described techniques relate to improved methods, systems, devices, and apparatuses that support techniques for identifying blockages between devices. Generally, the described techniques provide for improved methods of detecting potential beam blockages and performing beam management based on the detected blockages. In some cases, a user equipment (UE) may be communicate with a base station via a beam pair and the UE may utilize one or more sensors (e.g., sensors, or cameras, or both) of the UE to perceive the environment between the UE and base station. The UE may utilize such perception to identify potential blockages that may occur between the UE and the base station, such as a blockage that may impact the current beam pair being used. In some cases, the UE, the base station, or both may perform a beam management procedure prior to the blockage impacting communications so as to mitigate latency. For example, a UE, such as a UE associated with an extended reality (XR) device, may obtain frame data from one or more cameras, one or more sensors, or a combination thereof associated with the UE. The UE may determine a path of a beam providing communication between the UE and a base station, determine a base station location of a base station in communication with the UE, or both, where the base station location may be relative to a UE location of the UE. The UE may identify, based on the frame data, the path of the beam, the base station location, the UE location, or a combination thereof, a physical blockage to the communication between the UE and the base station. The UE may perform beam management for the communication between the UE and the base station based on identifying the physical blockage, so as to mitigate the impact the physical blockage may have on the communications between the UE and the base station.

A method for wireless communications at a UE is described. The method may include obtaining frame data from one or more cameras associated with the UE, determining a path of a beam providing communication between the UE and a base station, identifying, based on the frame data and the path of the beam, a physical blockage to the communication, and performing beam management for the communication between the UE and the base station based on identifying the physical blockage.

An apparatus for wireless communications at a UE is described. The apparatus may include a processor, memory coupled with the processor, and instructions stored in the memory. The instructions may be executable by the processor to cause the apparatus to obtain frame data from one or more cameras associated with the UE, determine a path of a beam providing communication between the UE and a base station, identify, based on the frame data and the path of the beam, a physical blockage to the communication, and perform beam management for the communication between the UE and the base station based on identifying the physical blockage.

Another apparatus for wireless communications at a UE is described. The apparatus may include means for obtaining frame data from one or more cameras associated with the UE, means for determining a path of a beam providing communication between the UE and a base station, means for identifying, based on the frame data and the path of the beam, a physical blockage to the communication, and means for performing beam management for the communication between the UE and the base station based on identifying the physical blockage.

A non-transitory computer-readable medium storing code for wireless communications at a UE is described. The code may include instructions executable by a processor to obtain frame data from one or more cameras associated with the UE, determine a path of a beam providing communication between the UE and a base station, identify, based on the frame data and the path of the beam, a physical blockage to the communication, and perform beam management for the communication between the UE and the base station based on identifying the physical blockage.

In some examples of the method, apparatuses, and non-transitory computer-readable medium described herein, determining the path of the beam may include operations, features, means, or instructions for determining a path of a UE beam, a base station beam, or both, where the UE beam and the base station beam may be a beam pair providing the communication between the UE and the base station.

In some examples of the method, apparatuses, and non-transitory computer-readable medium described herein, identifying the physical blockage may include operations, features, means, or instructions for identifying that the physical blockage impacts the UE beam, the base station beam, or both based on determining the path of the UE beam, the base station beam, or both.

Some examples of the method, apparatuses, and non-transitory computer-readable medium described herein may further include operations, features, means, or instructions for locating the path of the UE beam, the base station beam, or both on the frame data from the one or more cameras associated with the UE, where identifying the physical blockage may be based on locating the paths on the frame data.

Some examples of the method, apparatuses, and non-transitory computer-readable medium described herein may further include operations, features, means, or instructions for determining the path of the UE beam, the base station beam, or both may be based on a beam codebook of the UE.

In some examples of the method, apparatuses, and non-transitory computer-readable medium described herein, identifying the physical blockage may include operations, features, means, or instructions for identifying the physical blockage between a line-of-sight path, or a non-line-of-sight path between the UE and the base station.

In some examples of the method, apparatuses, and non-transitory computer-readable medium described herein, performing beam management may include operations, features, means, or instructions for identifying that the physical blockage impacts a first beam pair of the UE and the base station and switching to a second beam pair of the UE and the base station, where the second beam pair may be clear of the physical blockage.

In some examples of the method, apparatuses, and non-transitory computer-readable medium described herein, switching to the second beam pair may include operations, features, means, or instructions for performing measurements of one or more beam pairs, where the one or more beam pairs include wide beams, or beams associated with a set of phasers, or a combination thereof based on the physical blockage.

Some examples of the method, apparatuses, and non-transitory computer-readable medium described herein may further include operations, features, means, or instructions for switching back to the first beam pair upon determining that the first beam pair may be clear of the physical blockage.

Some examples of the method, apparatuses, and non-transitory computer-readable medium described herein may further include operations, features, means, or instructions for comparing an area associated with the physical blockage to a threshold associated with the first beam pair, where switching to the second beam pair may be based on the area associated with the physical blockage being greater than the threshold.

In some examples of the method, apparatuses, and non-transitory computer-readable medium described herein, identifying the physical blockage may include operations, features, means, or instructions for identifying the physical blockage as a potential blockage before the physical blockage impacts the communication, where the UE performs beam management before the physical blockage impacts the communication.

Some examples of the method, apparatuses, and non-transitory computer-readable medium described herein may further include operations, features, means, or instructions for identifying a time, a duration, or both the physical blockage may be expected to impact the communication.

Some examples of the method, apparatuses, and non-transitory computer-readable medium described herein may further include operations, features, means, or instructions for identifying one or more parameters of the physical blockage, the one or more parameters including a location of the physical blockage, a size of the physical blockage, a direction the physical blockage may be moving, a velocity of the physical blockage, or a combination thereof, where identifying the physical blockage may be based on the one or more parameters.

In some examples of the method, apparatuses, and non-transitory computer-readable medium described herein, obtaining the frame data may include operations, features, means, or instructions for obtaining the frame data in accordance with a rate, where the frame data includes an image obtained by the one or more cameras.

Some examples of the method, apparatuses, and non-transitory computer-readable medium described herein may further include operations, features, means, or instructions for determining a base station location of the base station in communication with the UE, the base station location relative to a UE location of the UE, where identifying the physical blockage includes identifying that the physical blockage may be between the UE location and the base station location.

Some examples of the method, apparatuses, and non-transitory computer-readable medium described herein may further include operations, features, means, or instructions for obtaining three-dimensional data from one or more sensors in accordance with a rate, the one or more sensors being six degree of freedom sensors of the UE and the three-dimensional data includes orientation data, location data, or both, where determining the base station location, identifying the physical blockage, or both, may be based on the three-dimensional data.

In some examples of the method, apparatuses, and non-transitory computer-readable medium described herein, the physical blockage may be a person, an object, or a combination thereof.

In some examples of the method, apparatuses, and non-transitory computer-readable medium described herein, the UE may be associated with an extended reality device.

DETAILED DESCRIPTION

Figure 1:
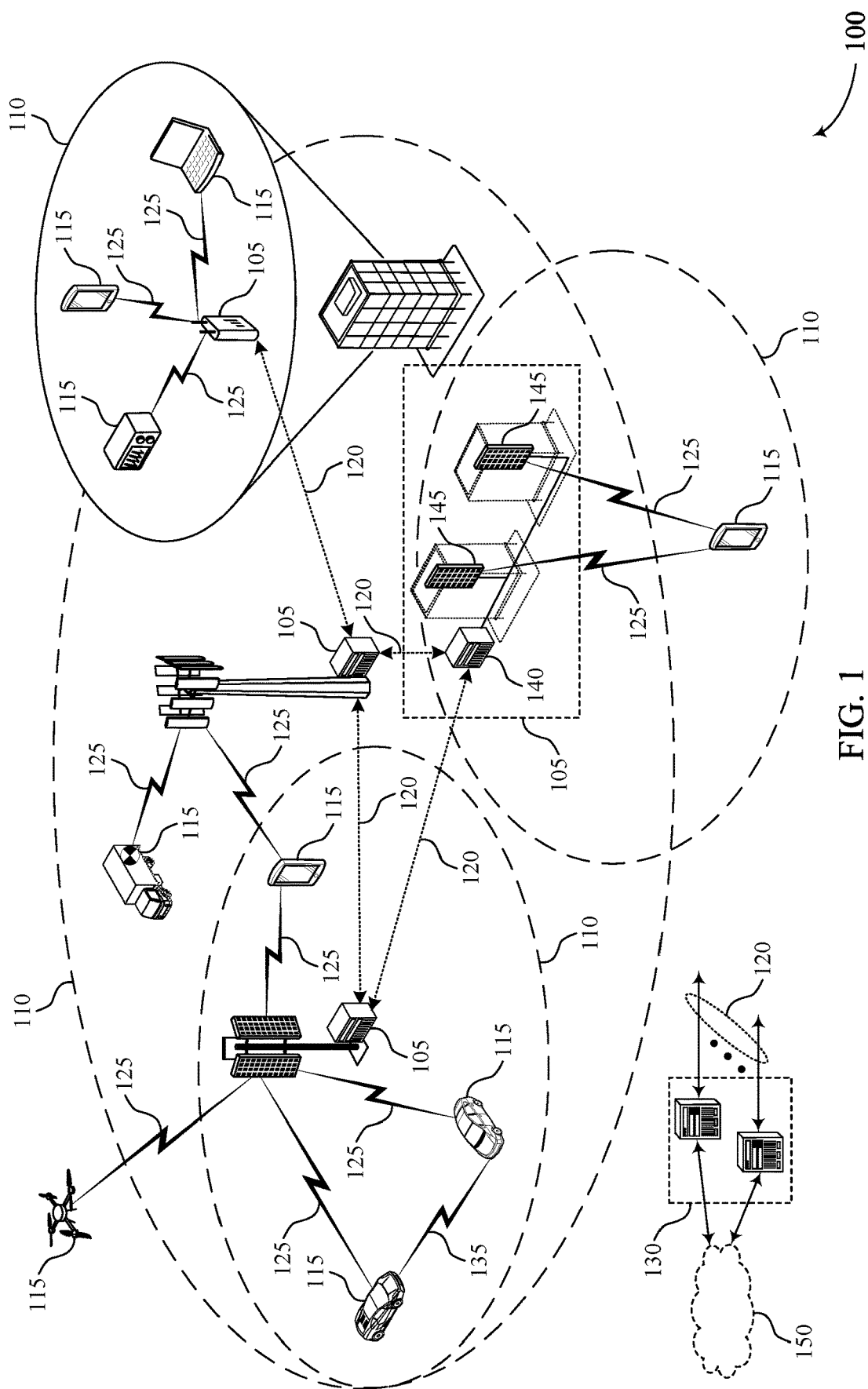
FIG. 1 illustrates an example of a wireless communications system that supports techniques for identifying blockages between devices in accordance with aspects of the present disclosure.

In some wireless communications systems (e.g., 5G systems), some applications may be configured to operate in accordance with low-latency, such as an extended reality (XR) application. Accordingly, an XR application may be implemented in a high frequency band, such as a millimeter wave (mmW) band, to provide low-latency service. To effectively implement the XR application in the high frequency band, a device may be configured to perform beam management so that that they device may use an appropriate beam pair for communications between the device and another device (e.g., between a user equipment (UE) and a base station). However, the beams that are formed in the high frequency band, may be highly directional, and in some cases, relatively narrow compared to beams in lower frequencies. Accordingly, such beams may be sensitive to blockages. For example, an object may move, or one or more of the devices may move so that an object is in the way of a current beam pair being used by the devices communicating with one another. When a blockage of a current beam pair occurs between two devices, the transmitting device, receiving device, or both may perform a beam management procedure to determine a second beam pair to avoid the blockage. Performing such as a beam management procedure after a blockage has already impacted a current beam pair may introduce latency, reliability, and power consumption.

To improve communications between devices, environment perception may be provided to a device, such as a UE so that the UE can detect potential blockers before the blockage impacts communications of the UE. Accordingly, upon detecting a potential blocker, the UE may preemptively implement a beam management procedure so that communications between the UE and another device, such as a base station, are not impacted by the blocker. In some cases, the UE may be associated with an XR device which may use one or more sensors, such as cameras to perform an XR application. The UE may receive data from cameras and or location sensors of an XR headset. For example, a UE may utilize cameras to detect when a user of the XR application may run into an object, such as a wall.

Accordingly, a UE may leverage the data from one or more sensors to identify potential blockages between the UE and a base station. The UE may determine a location of a base station the UE is communicating with, where the UE may identify the location of the base station in the image or video data. The UE may then determine whether the UE and base station are communicating via a line-of-sight (LOS) or non-line-of-sight (NLOS) scenario. In a LOS scenario, the UE may detect, using the image or video data, any objects that may move into a position that blocks the LOS path between the UE and base station. In the NLOS scenario, the UE may determine the direction of the UE and base station beams of a current beam pair being used being the UE and the base station. The UE may then determine whether any objects may move into a position that intersects with the determined beam positions. In either a LOS or NLOS scenario, the UE may take action prior to the blockage impacting the communications between the UE and base station so as to avoid negative impacts the blockage may have, such a as by performing a beam management procedure. For example, the UE may request for the base station to lower the MCS, the UE may determine to widen the beams, select a new beam pair, etc. In some cases, the UE may leverage the environmental perception to perform the beam management procedure.

Particular aspects of the subject matter described herein may be implemented to realize one or more advantages. The described techniques may support improvements in detecting environmental factors that may impact communications between two or more devices, and support improvements in performing beam management procedures based on the detected environmental factors. Accordingly, the described techniques may decrease latency, improve reliability, and improve throughput, among other advantages. As such, supported techniques may include improved network operations and, in some examples, may promote network efficiencies, among other benefits.

Aspects of the disclosure are initially described in the context of wireless communications systems. Aspects are the described with reference to a process flow. Aspects of the disclosure are further illustrated by and described with reference to apparatus diagrams, system diagrams, and flowcharts that relate to techniques for identifying blockages between devices.

FIG. 1 illustrates an example of a wireless communications system 100 that supports techniques for identifying blockages between devices in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some wireless communications systems, such as wireless communications systems 100, a device, such as a UE 115 associated with an XR device, may obtain frame data from one or more cameras, one or more sensors, or a combination thereof associated with the UE 115. The UE 115 may determine a path of a beam providing communication between the UE 115 and a base station 105, determine a location of a base station 105 in communication with the UE 115, or both, where the base station location may be relative to a location of the UE 115. The UE 115 may identify, based on the frame data, the path of the beam, the base station location, the UE location, or a combination thereof, a physical blockage to the communication. The UE 115 may perform beam management for the communication between the UE 115 and the base station 105 based on identifying the physical blockage, so as to mitigate the impact the physical blockage may have on the communications between the UE 115 and the base station 105.

Figure 2:
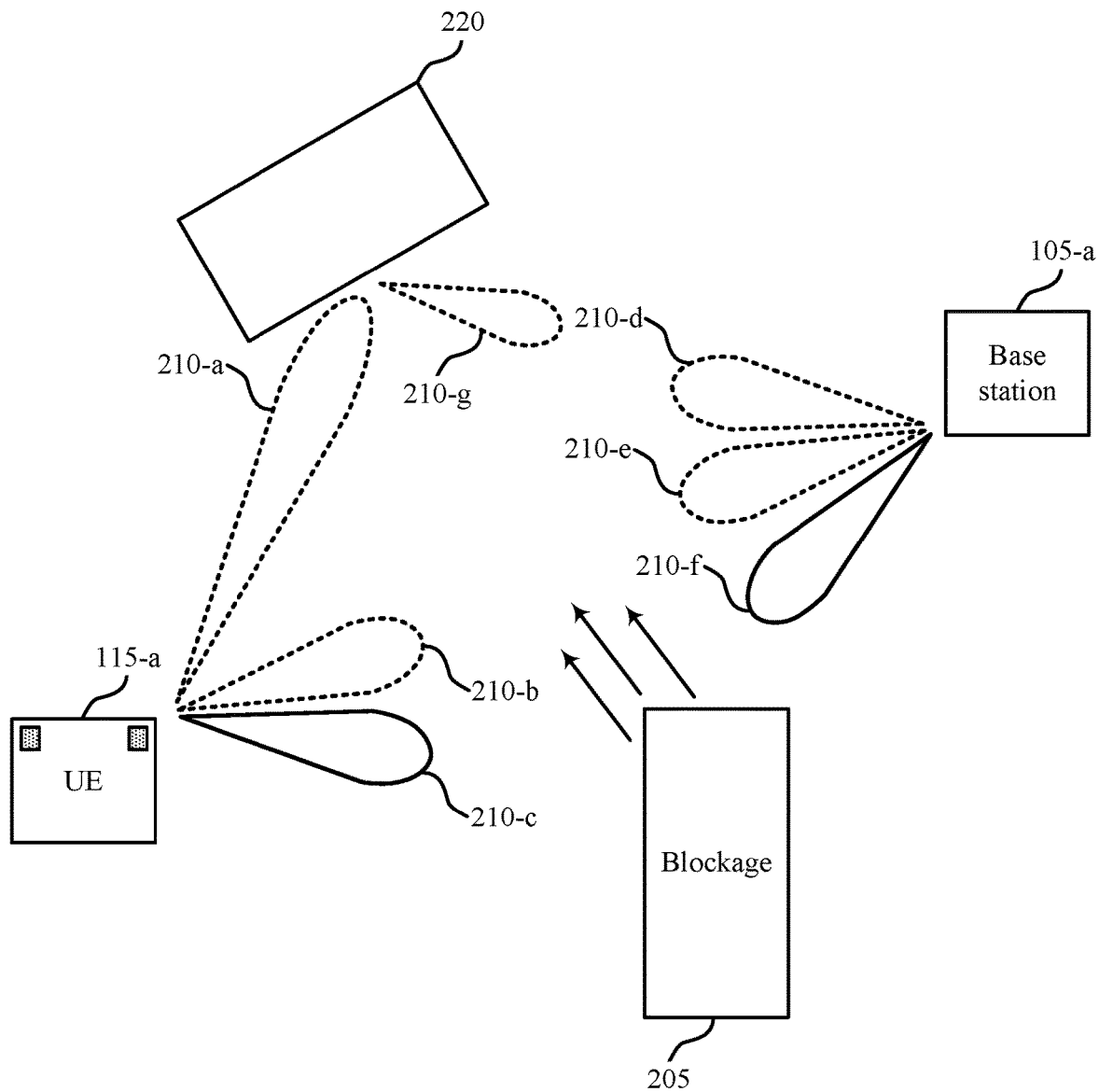
FIG. 2 illustrates an example of a wireless communications system that supports techniques for identifying blockages between devices in accordance with aspects of the present disclosure.

FIG. 2 illustrates an example of a wireless communications system 200 that supports techniques for identifying blockages between devices in accordance with aspects of the present disclosure. The wireless communications system 200 may include base station 105-*a* and UE 115-*a*, which may be examples of a base station 105 and a UE 115 as described with reference to FIG. 1. In some cases, UE 115-*a* may implement a blockage detection and beam management procedure. For example, UE 115-*a* may perform such a procedure to aid communications between UE 115-*a* and base station 105-*a*. Additionally or alternatively, other wireless devices, such as base station 105-*a*, or some other network device, may implement a same or similar procedure.

In some wireless communications systems (e.g., 5G systems), some applications may be configured to operate in accordance with low-latency, such as an XR application. Accordingly, an XR application may be implemented in a high frequency band, such as a mmW band, to provide low-latency service to the XR application. As directional communication beams may result at such frequencies, to effectively implement the XR application in the high frequency band, a device may be configured to perform beam management so that the device may use an appropriate beam pair for communications between the device and another device (e.g., between a UE 115 and a base station 105). For example, beam management may include selecting a preferred (or best) beam pair (e.g., in terms of beamforming gain) of the UE 115 and the base station 105 at any given time. In some cases, a UE 115 and/or a base station 105 may perform beam management in the analog domain.

However, the beams that are formed in the high frequency band, may be highly directional, and in some cases, relatively narrow compared to beams in lower frequencies. Usage of directional beams may lead to employing more beams for coverage compared to using wide beams, for example and thus, a device may perform many measurements to measure the beams to achieve quality performance. In some cases, a UE 115 may be configured to store measured beams pairs (e.g., a base station beam, a UE beam) with the corresponding measurements (e.g., reference signal received power (RSRP), reference signal received quality (RSRQ)) in a measurement database. From all the measured beam pairs in the measurement database, a UE 115 may select a UE beam based on some wireless statistic (e.g., a beam pair that maximizes RSRP or SNR). Accordingly, by performing a large amount of measurements or narrow beams, power consumption of the UE 115 may be increased. Additionally, such directional beams may be sensitive to environmental changes. In one example, directional beams may be sensitive to rotation and motion. As the directional beams are narrow, a slight rotation or motion of the device (e.g., rotation or motion of a user of the device) may result in decreased performance, and in some cases, may result in a beam management procedure. In another example, directional beams may be sensitive to blockages. If an object moves, or one or more of the devices that are communicating moves so that an object is in the way of a current beam pair being used by the devices that are communicating with one another, the communications between the devices may be impacted. In some cases, such as in mmW bands, signal attenuation may be higher due to a blockage.

When a blockage of a current beam pair occurs between two devices, the transmitting device, receiving device, or both may perform a beam management procedure to determine a second beam pair to avoid the blockage. In some cases, performing beam management procedures to search for an optimal beam pair, while important to ensuring high link quality, may lead to delays in communication. Performing such as a beam management procedure after a blockage has already impacted a current beam pair may introduce latency, and reliability. Additionally, as discussed, the beams are directional and narrow, a device may perform measurements on a large set of beams to search for an optimal beam which may result in increased power consumption.

In some implementations, a device may perform a beam management procedure without knowledge of the environment surrounding the device. Accordingly, the device may rely on the beam codebook structure of the device as well as previous beam measurements to select an optimal beam. Such a procedure may result in a delay in finding the optimal beam as well as lead to increased power consumption because the device may perform measurements of many beams without knowledge of the environment. For example, because the device may not have knowledge of the environment around the device, the device may measure beams that are already blocked. Thus, having information about the device and/or the environment behavior may aid with the beam selection, and hence, lead to improvements in latency and power gains.

Accordingly, environment perception may be provided to a device, such as a UE 115 so that the UE 115 can detect potential blockers before the blockage impacts communications of the UE. Additionally, the UE 115 may utilize the environment perception to perform beam management procedures. For example, UE 115-*a* may utilize environment perception to detect blockage 205 and upon detecting blockage 205, UE 115-*a* may preemptively implement a beam management procedure so that communications between UE 115-*a* and another device, such as base station 105-*a*, are not impacted by the blockage 205.

To obtain environmental perception, UE 115-*a* may leverage image or video data from sensors of UE 115-*a*. In some cases, UE 115-*a* may be associated with an XR device, such as an XR headset (e.g., a head mounted display (HMD)). An XR headset may already detect and use environmental perception to support an XR application. For example, an XR headset may utilize one or more cameras, one or more sensors, or a combination therefore to detect when a user of the XR application (e.g., a user wearing the XR headset) may run into an object, such as a wall. Accordingly, a UE 115 (e.g., a UE 115 associated with the XR headset, or a UE 115 that is an XR headset) may be configured to leverage the environmental perception techniques obtained for the XR application to additionally perform dynamic blockage detection and beam management procedures.

For example, UE 115-*a* may have or obtain information from one or more sensors 215, where the one or more sensors 215 may include one or more cameras, one or more location sensors, or a combination thereof. In some cases, UE 115-*a* may receive frame data from the one or more cameras, where the frame data may include time stamped camera snapshots. In some cases, UE 115-*a*, or an XR headset associated with UE 115-*a* may include two cameras, such as a left camera (e.g., a sensing left camera and/or red, green and blue wavelength (RGB) left camera) and a right camera (e.g., right sensing camera and/or RGB right camera). Each camera may generate a field of view (e.g., an 150 degree field of view) with a particular resolution (e.g., a resolution of 640×400). In some cases, the data frames may be in grey scale (e.g., assuming 8 bits, each pixel may have a value between [0, 255]). UE 115-a may receive frame data from the one or more cameras in accordance with a rate, such as 30 Hz. UE 115-a may receive frame data from each camera at the same time, or at different times. In some cases, UE 115-a may receive frame data from each camera at a same rate, or at different rates. In some cases, the frame data may be derived from pictures or video.

In some implementations, the one or more location sensors may include 6 degrees of freedom (DoF) sensors (e.g., a world coordinate system in which 6 DoF is produced). The 6 DoF sensors may provide a location of the UE 115 in 3D space (e.g., translation vector), the orientation of the UE 115 in 3D space (e.g., rotation matrix), or a combination thereof. UE 115-a may receive frame data from the one or more cameras in accordance with a rate, such as 30 Hz. In some cases, 6 DoF information may be predicted over a future amount of time, such as over the next 100 ms.

Accordingly, UE 115-a may receive data from one or more sensors to achieve environmental perception (e.g., in accordance with XR coordinate systems). In some cases, the XR system (e.g., the one or more sensors may form an XR system) may provide transformation from and to any coordinate system.

To perform dynamic blockage detection, UE 115-a may be configured to detect a location of base station 105-a, and/or a path of one or more beams 210 being used by UE 115-a and base station 105-a to communicate. Additionally, UE 115-a may be configured to detect potential blockages 205, such as a location, and/or behavior of potential blockages 205 relative to UE 115-a and/or base station 105-a, beam paths (e.g., a currently used beam path), or a combination thereof. In some cases, UE 115-a may be configured to project a location of base station 105-a, a UE beam direction, a base station beam direction, or both on frame data and identify potential blockages 205 on the frame data, and UE 115-a may determine any current or potential interferences that may occur based on the projections.

In order to perform beam projection on the frame data, UE 115-a may read beam information from a beam codebook associated with UE 115-a to determine one or more parameters of the current beam 210 being used by UE 115-a (e.g., $\phi$, $\theta$, and/or beam width of the serving UE beam 210). Using the one or more parameters, UE 115-a may determine a 3D point in space in which the beam 210 is pointing. In some cases, UE 115-a may determine the 3D point based on a beam coordinate system, and therefore UE 115-a may determine the 3D point in the beam coordinate system. Accordingly, UE 115-a may map the beam coordinate system to the left sensing camera coordinate system, the right sensing camera coordinate system, or both. To do so, UE 115-a may use the RGB left camera (e.g., RGB_2_left) transformation as an approximation. Then, UE 115-a may output a point in the left sensing camera coordinate system to indicate where the beam is pointing. UE 115-a may use the camera model to project the beam direction on the left camera frame (e.g., on a pixel level, where the output may be equal to $p_i^{left}$). UE 115-a may use the camera transformation (e.g., left_2_right transformation) and camera model, to achieve a right output (e.g., output $p_i^{right}$). UE 115-a may then use the field of view to transform the width of the beam into a pixel beam width (e.g., beam_width_pixel). For example, if the field of view is 150 degree, then the pixel width is approximately 640 pixels. Thus, a beam width of 22 degrees (with reference to field of view) may result in a pixel beam width equal to (22×640)/150. UE 115-a may draw a rectangle showing the area covered by the beam on the frame data. In some cases, the UE 115 may draw the rectangle based on a receive (e.g., seen) depth of the beam, such as 8 m.

Upon identifying the location of base station 105-a, a location of one or more beam paths, or both, UE 115-a may monitor for one or more potential blockages 205. In some cases, UE 115-a may be configured to monitor for a certain type of blockages, such as people, furniture, etc. In some cases, UE 115-a may be configured to identify any and all potential blockages 205, or UE 115-a may be configured with a limit of blockages UE 115-a may monitor for. For example, at any one time, UE 115-a may be configured to monitor for at most two potential blockages. In some cases, to detect blockage 205, UE 115-a may utilize one or more preconfigured programs, or machine learning algorithms, or a combination thereof (e.g., YOLOv3).

Based on frame data, 3D data, or a combination thereof, UE 115-a may determine a size of a blockage 205. In some cases, UE 115-a may be able to monitor a behavior of a blockage 205 over time. For example, UE 115-a may identify whether the blockage 205 is static, or whether the behavior of the blockage 205 is dynamic. In some cases, UE 115-a may identify a velocity the blockage 205 is moving at, a direction the blockage 205 is moving in, a path the blockage 205 is following, etc. UE 115-a may predict a future event based on the data. For example, UE 115-a may predict a future behavior of a blockage 205, when the blockage 205 may impact current communications between UE 115-a and base station 105-a, how long a blockage 205 may impact current communications (e.g., a current beam pair), how the blockage 205 may impact current communications (e.g., impact on RSRP), etc.

Based on the frame data, 3D data, or a combination thereof, UE 115-a may predict whether a beam pair will be blocked or not in the next X time unit (e.g., 100 ms) by the blockage 205 and/or predict when the blockage 205 may block a beam pair. In some implementations, to perform such as prediction, UE 115-a may identify one or more parameters of the blockage 205 (e.g., type size, velocity, path, direction) and place an indicator of the blockage 205 on the frame data based on the one or more parameters. UE 115-a may perform the prediction in the pixel domain or in the 3D space. The following example is related to the pixel domain approach, but the 3D space approach may follow similarly. UE 115-a may place a box indicating the blockage 205 on the frame data (e.g., track blocker box (bbox) of blocker in a buffer, where size 10, for example, may be used). UE 115-a may use average height and width and a center of the blockage may identified (e.g., center_x and center_y may be used without averaging). UE 115-a may track the velocity of the blockage using a buffer size (e.g., size 10, for example). UE 115-a may track the velocity using Equation 1 through 4.

$$\text{Dist\_}x = \text{abs}(\text{current\_center\_}x - \text{prev\_center\_}x) \quad \text{Equation (1)}$$

$$\text{Dist\_}y = \text{abs}(\text{current\_center\_}y - \text{prev\_center\_}y) \quad \text{Equation (2)}$$

$$\text{Vel\_}x = \text{average last 10 dist\_}x \quad \text{Equation (3)}$$

$$\text{Vel\_}y = \text{average last 10 dist\_}y \quad \text{Equation (4)}$$

where Vel_x may refer to a velocity in pixels/frame in x-direction, and Vel_y may refer to a velocity in pixels/ frame in y-direction. Then UE 115-*a* may use the box indicating the blockage 205, the box indicating the base station 105, the box indicating one or more beams of a beam pair, or a combination thereof, and the determined velocity of the blockage 205, to predict an intersection of blockage 205 with a beam pair. For example, for frame_diff in {0,1,2,3} UE 115-*a* may use the following equations to predict a location of a corner of the blockage box:
Vel_x_temp=vel_x*frame_diff,
Vel_y_temp=vel_y*frame_diff, and
Predicted_top_left_x=bbox_top_left_x+Vel_x_temp. UE 115-*a* may perform the same or similar equations to for the top left y, bottom right x, and bottom right y. If intersection of predicted blockage box and base station and/or beam box on the frame data is greater than a threshold, such as 80% (e.g., if the boxes intersect and the intersected area is greater than a threshold) then UE 115-*a* may output (1, frame_diff), otherwise, may output 0. The output may determine whether or how UE 115-*a* performs a beam management procedure.

Accordingly, for each frame, UE 115-*a* may mark the location of a base station 105, a location of one or more beams, an indication of the blockage 205, or a combination thereof. Then from frame to frame, UE 115-*a* may monitor the blockage 205 in relation to the communication environment of UE 115-*a* and base station 105-*a*. Accordingly, based on identifying the location and/or behavior if the blockage 205, UE 115-*a* may determine if the blockage 205 will impact the communications between UE 115-*a* and base station 105-*a*.

In some cases, beam blockage detection may be based on whether UE 115-*a* is communicating with base station 105-*a* via an LOS or NLOS path. A LOS path may refer to a scenario in which UE 115-*a* and base station 105-*a* are using a direct beam pair, such as beams 210-*b* and 210-*e*. A NLOS path may refer to a scenario in which there is an object between UE 115-*a* and base station 105-*a* and in order to communicate, may reflect beams 210 off of one or more objects 220 to reach one another. For example, a LOS path between UE 115-*a* and base station 105-*a* may be blocked (not shown) and in order to communicate, UE 115-*a* and base station 105-*a* may determine to reflect beams off object 220. As such, UE 115-*a* may direct beam 210-*a* in the direction of object 220 to produce beam 210-*g* directed toward base station 105-*a*. Base station 105-*a* may perform a similar procedure to produce a reflected beam directed towards UE 115-*a*. In the LOS scenario, a blockage 205 may block the LOS path between UE 115-*a* and base station 105-*a*. For example, blockage 205 may block base station 105-*a* from UE 115-*a*, or vice versa. In a NLOS scenario, a blockage 205 may block a NLOS path, such that the blockage 205 blocks a beam path being used by UE 115-*a* and base station 105-*a*, such as the beam paths associated with beam 210-*a*, or 210-*g*, or both.

Accordingly, UE 115-*a* may determine whether UE 115-*a* and base station 105-*b* are communicating via a LOS path or a NLOS path to identify potential blockages 205. In some cases, to do so, UE 115-*a* may receive, such as from base station 105-*a*, an indication of whether UE 115-*a* and base station 105-*a* are communicating via a LOS or NLOS path.

In the case of a LOS path, UE 115-*a* may identify a location of base station 105-*a*. UE 115-*a* may track base station 105-*a* (e.g., such as if UE 115-*a* is moving in location or orientation). For example, UE 115-*a* may identify the location of base station 105-*a* relative to UE 115-*a* using the one or more sensors 215. In some cases, UE 115-*a* may locate base station 105-*a* in frame data, such as in one or both pixel-camera frames from the left and right camera. In some cases, UE 115-*a* may identify a location of base station 105-*a* in some combination of frame data and 3D space, such as by using the frame data and 6 DoF data. UE 115-*a* may be able to locate base station 105-*a* using the one or more sensors 215 due to the UE 115-*a* and base station 105-*a* being located in an indoor, and/or small environment. Additionally, UE 115-*a* may monitor for potential blockages 205 using the frame data, the 6 DoF data, or a combination thereof. As UE 115-*a* may track where base station 105-*a* is relative to UE 115-*a*, UE 115-*a* may be able to detect when a potential blockage 205 may intersect a LOS path between UE 115-*a* and base station 105-*a* (e.g., in pixel domain, 3D space, or both).

In the case that UE 115-*a* and base station 105-*a* are communicating via a NLOS path, UE 115-*a* may detect (and/or track) the direction of UE beams and base station beams of a current beam pair being used by UE 115-*a* the base station 105-*a*. In some cases, UE 115-*a* may detect where the UE beams and/or the base station beams are pointing in frame data, 3D space, or a combination thereof such as by using XR system of transformation. UE 115-*a* may then determine whether any potential blockages 205 may move into a position that intersects with the determined beam positions using frame data, 6 DoF data, or both (e.g., in pixel domain, 3D space, or both).

In either a LOS or NLOS scenario, if UE 115-*a* detects a potential blockage 205, UE 115-*a* may take action prior to the blockage impacting the communications between UE 115-*a* and base station 105-*a* so as to avoid negative impacts the blockage may have. For example, UE 115-*a* may request for base station 105-*a* to lower the MCS, UE 115-*a* may determine to widen the beams, select a new beam pair, etc.

For example, at time t, UE 115-*a* may predict a potential blockage 205. In some cases, UE 115-*a* may input the prediction into a beam management algorithm. The beam management algorithm may provide a set of one or more beams to measure based on the blockage 205. For example, the beam management algorithm may indicate a set of beams that may not be impacted by the blockage 205 (e.g., or minimally impacted). In some cases, the beam management algorithm may indicate for UE 115-*a* to measure only wide beams 210. In some cases, the beam management algorithm may indicate for UE 115-*a* to measure only beams from certain phasers (based on the direction of motion of the blockage 205). In some cases, the beam management algorithm may indicate for UE 115-*a* to switch to an optimal beam determined right before the blockage 205 was detected. In some cases, the beam management algorithm may indicate for UE 115-*a* to switch back to a normal list of measurements and/or to a previous serving beam when blockage 205 is over.

In some cases, UE 115-*a* may determine to do nothing based on determining that the blockage 205 will minimally impact communications (e.g., minimally reduce RSRP), impact communications for short amount of time (e.g., an amount of time less than a threshold), etc.

In an example of a blockage detection and beam management procedure, UE 115-*a* and base station 105-*a* may be communicating via a first beam pair including beams 210-*c* and 210-*f* UE 115-*a* may determine whether UE 115-*a* and base station 105-*a* are communicating via a LOS path or NLOS path. UE 115-*a* may obtain frame data, 3D data, or a combination therefore in accordance with a rate and may monitor for potential blockages 205. For example, in a first frame, UE 115-*a* may identify blockage 205 (prior to the blockage impacting communications). Based on the first frame, a second frame (e.g., approximately 200 ms after the first frame in accordance with the rate), or both UE 115-*a* may determine one or more parameters of a detected blockage 205 (e.g., velocity, path, direction, type, size). UE 115-*a* may use the one or more parameters to determine if and when the blockage 205 may impact the first beam pair. For example, UE 115-*a* may predict that blockage 205 may impact the first beam pair in 100 ms. In some cases, UE 115-*a* may predict how long, or to what extent (e.g., impact on RSRP) the blockage 205 may have on the first beam pair. UE 115-*a* may continue to monitor frame data. For example, UE 115-*a* may identify that the blockage 205 impacted the first beam pair as predicted, and may identify when the blockage 205 of the first beam pair is over.

In some cases, UE 115-*a* may use the frame date to determine an action to take so that communications are not impacted (e.g., or impacted minimally). For example, UE 115-*a* may determine to measure a second beam pair (e.g., beams 210-*b* and 210-*e*), and a third beam pair (e.g., beams 210-*a* and 210-*d*) based on predicting that the blockage 205 may not impact the second and third beam pairs. Based on the measurements, UE 115-*a* may determine to switch to a different beam pair than the first beam pair for at least the duration that the blockage 205 impacts the first beam pair. In some cases, after the blockage 205 is gone or is otherwise not impacting the first beam pair, UE 115-*a* may switch back to the first beam pair.

Accordingly, by allowing a UE 115-*a* to utilize environment perception to perform beam blocking detection and beam management, UE 115-*a* may achieve improved link quality during a blockage, achieve lower latency because UE 115-*a* may react proactively to a blockage which may enhance block error rate (BLER) and lower the number of retransmissions, and/or achieve lower power consumption, because UE 115-*a* may identify a set of beams to measure based on the blockage 205 which may save UE 115-*a* from measuring blocked beams.

Figure 3:
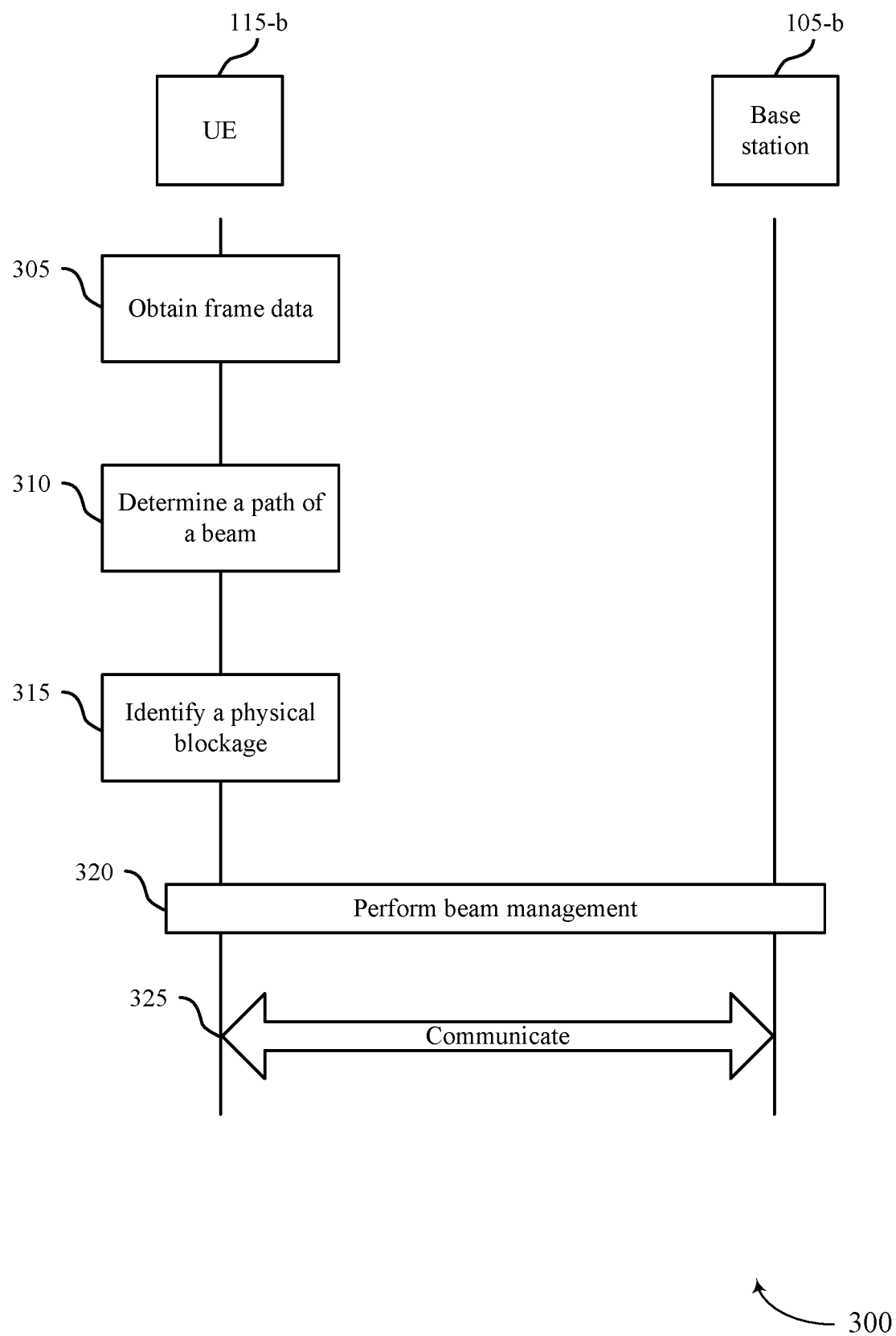
FIG. 3 illustrates an example of a process flow that supports techniques for identifying blockages between devices in accordance with aspects of the present disclosure.

FIG. 3 illustrates an example of a process flow 300 that supports techniques for identifying blockages between devices in accordance with aspects of the present disclosure. The process flow 300 may illustrate an example blockage detection and beam management procedure. For example, UE 115-*b* may perform such a procedure to aid communications between UE 115-*b* and base station 105-*b*. Base station 105-*b* and UE 115-*b*, may be examples of the corresponding wireless devices described with reference to FIGS. 1 and 2. UE 115-*b* may be associated with an XR device. In some cases, instead of UE 115-*b* implementing the blockage detection and beam management procedure, a different type of wireless device (e.g., a base station 105, a node) may perform a same or similar procedure. Alternative examples of the following may be implemented, where some steps are performed in a different order than described or are not performed at all. In some cases, steps may include additional features not mentioned below, or further steps may be added.

At 305, UE 115-*b* may obtain frame data from one or more cameras associated with UE 115-*b*. Obtaining the frame data may include obtaining the frame data in accordance with a rate (e.g., a preconfigure rate), where the frame data may include an image obtained by the one or more cameras.

In some cases, UE 115-*b* may obtain 3D data from one or more sensors in accordance with a rate, where the one or more sensors may be six degree of freedom sensors of UE 115-*b* and the 3D data may include orientation data, location data, or both.

At 310, UE 115-*b* may determine a path of a beam providing communication between the UE and base station 105-*b*. In some cases, UE 115-*a* may determine a path of a UE beam, a base station beam, or both, where the UE beam and the base station beam may be a beam pair providing the communication between UE 115-*b* and base station 105-*b*. Determining the path of the UE beam, the base station beam, or both may be based on a beam codebook of UE 115-*b*.

In some cases, UE 115-*b* may determine a base station location of base station 105-*b* in communication with UE 115-*b*, where the base station location may be relative to a UE location of UE 115-*b*.

At 315, UE 115-*b* may identify, based on the frame data and the path of the beam, a physical blockage to the communication between UE 115-*b* and base station 105-*b*. Identifying the physical blockage may include identifying that the physical blockage impacts the UE beam, the base station beam, or both based on determining the path of the UE beam, the base station beam, or both. In some implementations, UE 115-*b* may locate the path of the UE beam, the base station beam, or both on the frame data from the one or more cameras associated with UE 115-*b*, where identifying the physical blockage may be based on locating the paths on the frame data. Identifying the physical blockage may include identifying that the physical blockage is between the UE location and the base station location.

In some implementations, identifying the physical blockage may include identifying the physical blockage between a LOS path, or a NLOS path between UE 115-*b* and base station 105-*b*. In some cases, UE 115-*b* may compare an area associated with the physical blockage to a threshold associated with the first beam pair, where switching to the second beam pair may be based on the area associated with the physical blockage being greater than the threshold.

In some cases, identifying the physical blockage may include identifying the physical blockage as a potential blockage before the physical blockage impacts the communication between UE 115-*b* and base station 105-*b*. UE 115-*b* may identify a time, a duration, or both the physical blockage is expected to impact the communication between UE 115-*b* and base station 105-*b*. In some cases, UE 115-*b* may identify one or more parameters of the physical blockage, where the one or more parameters may include a location of the physical blockage, a size of the physical blockage, a direction the physical blockage is moving, a velocity of the physical blockage, or a combination thereof. Identifying the physical blockage may be based on the one or more parameters.

Determining the base station location, identifying the physical blockage, or both, may be based at least in part on the 3D data. The physical blockage may be a person, an object, or a combination thereof.

At 320, UE 115-*b* may perform beam management for the communication between UE 115-*b* and base station 105-*b* based on identifying the physical blockage. In some implementations, performing beam management may include identifying that the physical blockage impacts a first beam pair of UE 115-*b* and base station 105-*b*, and switching to a second beam pair of UE 115-*b* and base station 105-*b*. In some cases, UE 115-*b* may switch to the second beam pair based on the second beam pair being clear of the physical blockage. Switching to the second beam pair may include performing measurements of one or more beam pairs, where the one or more beam pairs include wide beams, or beams associated with a set of phasers, or a combination thereof based at least in part on the physical blockage. In some cases, UE 115-*b* may switch back to the first beam pair upon determining that the first beam pair is clear of the physical blockage.

In some cases, UE 115-*b* may perform beam management before the physical blockage impacts the communication between UE 115-*b* and base station 105-*b*.

At 325, UE 115-*b* may communicate with base station 105-*b* in accordance with the beam management procedure.

Figure 4:
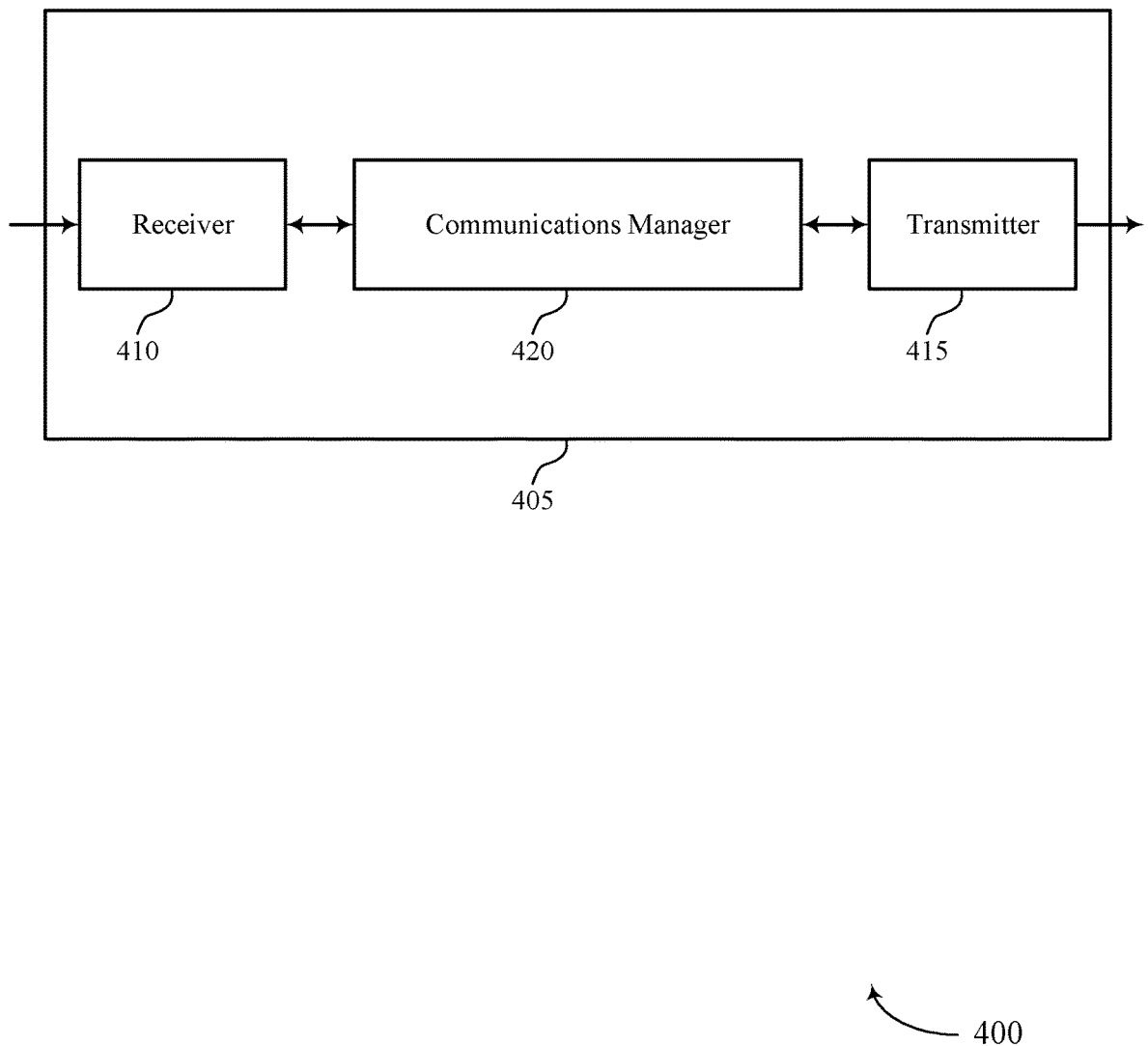
FIGS. 4 and 5 show block diagrams of devices that support techniques for identifying blockages between devices in accordance with aspects of the present disclosure.

FIG. 4 shows a block diagram 400 of a device 405 that supports techniques for identifying blockages between devices in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for identifying blockages between devices). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for identifying blockages between devices). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for identifying blockages between devices as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for obtaining frame data from one or more cameras associated with the UE. The communications manager 420 may be configured as or otherwise support a means for determining a path of a beam providing communication between the UE and a base station. The communications manager 420 may be configured as or otherwise support a means for identifying, based at least in part on the frame data and the path of the beam, a physical blockage to the communication. The communications manager 420 may be configured as or otherwise support a means for performing beam management for the communication between the UE and the base station based on identifying the physical blockage.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for more efficient utilization of communication resources.

Figure 5:
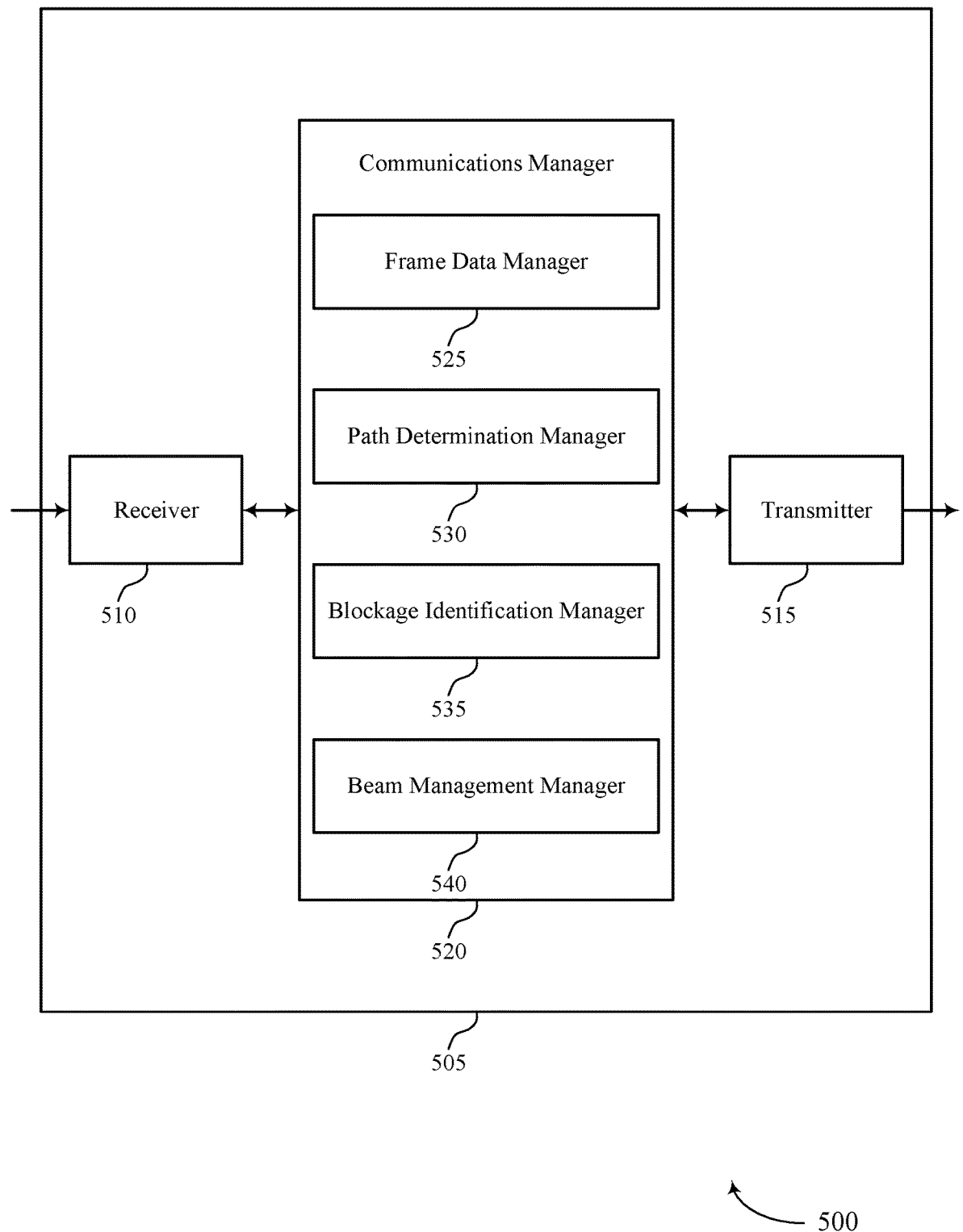

FIG. 5 shows a block diagram 500 of a device 505 that supports techniques for identifying blockages between devices in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for identifying blockages between devices). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for identifying blockages between devices). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for identifying blockages between devices as described herein. For example, the communications manager 520 may include a frame data manager 525, a path determination manager 530, a blockage identification manager 535, a beam management manager 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The frame data manager 525 may be configured as or otherwise support a means for obtaining frame data from one or more cameras associated with the UE. The path determination manager 530 may be configured as or otherwise support a means for determining a path of a beam providing communication between the UE and a base station. The blockage identification manager 535 may be configured as or otherwise support a means for identifying, based at least in part on the frame data and the path of the beam, a physical blockage to the communication. The beam management manager 540 may be configured as or otherwise support a means for performing beam management for the communication between the UE and the base station based on identifying the physical blockage.

Figure 6:
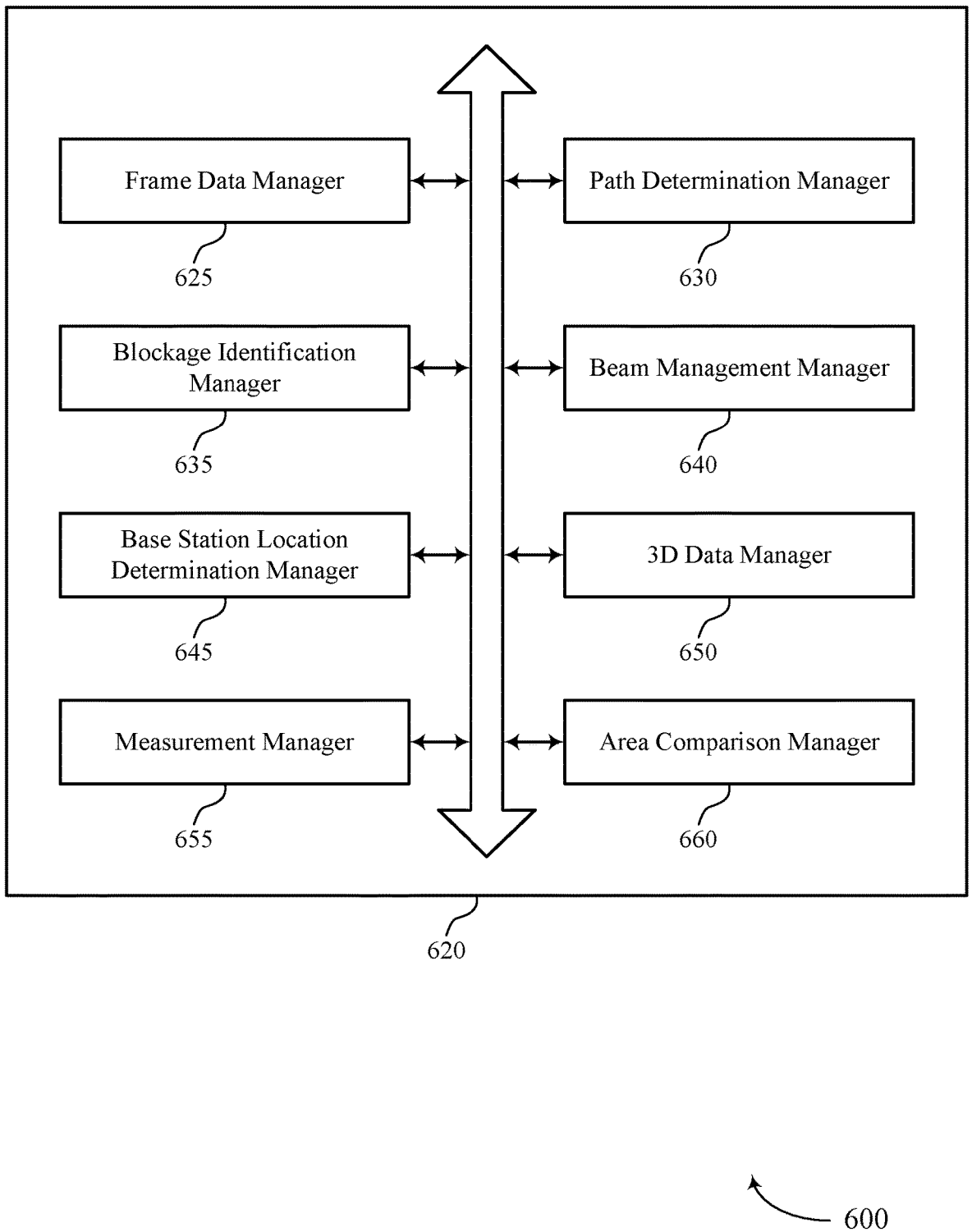
FIG. 6 shows a block diagram of a communications manager that supports techniques for identifying blockages between devices in accordance with aspects of the present disclosure.

FIG. 6 shows a block diagram 600 of a communications manager 620 that supports techniques for identifying blockages between devices in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for identifying blockages between devices as described herein. For example, the communications manager 620 may include a frame data manager 625, a base station location determination manager 645, a blockage identification manager 635, a beam management manager 640, a path determination manager 630, a 3D data manager 650, a measurement manager 655, an area comparison manager 660, or any combination thereof. Each of these components may communicate, directly or indirectly, with one another (e.g., via one or more buses).

The communications manager 620 may support wireless communications at a UE in accordance with examples as disclosed herein. The frame data manager 625 may be configured as or otherwise support a means for obtaining frame data from one or more cameras associated with the UE. The path determination manager 630 may be configured as or otherwise support a means for determining a path of a beam providing communication between the UE and a base station. The blockage identification manager 635 may be configured as or otherwise support a means for identifying, based at least in part on the frame data and the path of the beam, a physical blockage to the communication. The beam management manager 640 may be configured as or otherwise support a means for performing beam management for the communication between the UE and the base station based on identifying the physical blockage.

In some examples, to support determining the path of the beam, the path determination manager 630 may be configured as or otherwise support a means for determining a path of a UE beam, a base station beam, or both, where the UE beam and the base station beam are a beam pair providing the communication between the UE and the base station.

In some examples, to support identifying the physical blockage, the blockage identification manager 635 may be configured as or otherwise support a means for identifying that the physical blockage impacts the UE beam, the base station beam, or both based on determining the path of the UE beam, the base station beam, or both.

In some examples, the blockage identification manager 635 may be configured as or otherwise support a means for locating the path of the UE beam, the base station beam, or both on the frame data from the one or more cameras associated with the UE, where identifying the physical blockage is based on locating the paths on the frame data.

In some examples, determining the path of the UE beam, the base station beam, or both is based on a beam codebook of the UE.

In some examples, to support identifying the physical blockage, the blockage identification manager 635 may be configured as or otherwise support a means for identifying the physical blockage between a line-of-sight path, or a non-line-of-sight path between the UE and the base station.

In some examples, to support performing beam management, the blockage identification manager 635 may be configured as or otherwise support a means for identifying that the physical blockage impacts a first beam pair of the UE and the base station. In some examples, to support performing beam management, the beam management manager 640 may be configured as or otherwise support a means for switching to a second beam pair of the UE and the base station, where the second beam pair is clear of the physical blockage.

In some examples, to support switching to the second beam pair, the measurement manager 655 may be configured as or otherwise support a means for performing measurements of one or more beam pairs, where the one or more beam pairs include wide beams, or beams associated with a set of phasers, or a combination thereof based on the physical blockage.

In some examples, the beam management manager 640 may be configured as or otherwise support a means for switching back to the first beam pair upon determining that the first beam pair is clear of the physical blockage.

In some examples, the area comparison manager 660 may be configured as or otherwise support a means for comparing an area associated with the physical blockage to a threshold associated with the first beam pair, where switching to the second beam pair is based on the area associated with the physical blockage being greater than the threshold.

In some examples, to support identifying the physical blockage, the blockage identification manager 635 may be configured as or otherwise support a means for identifying the physical blockage as a potential blockage before the physical blockage impacts the communication between the UE and the base station, where the UE performs beam management before the physical blockage impacts the communication between the UE and the base station.

In some examples, the blockage identification manager 635 may be configured as or otherwise support a means for identifying a time, a duration, or both the physical blockage is expected to impact the communication between the UE and the base station.

In some examples, the blockage identification manager 635 may be configured as or otherwise support a means for identifying one or more parameters of the physical blockage, the one or more parameters including a location of the physical blockage, a size of the physical blockage, a direction the physical blockage is moving, a velocity of the physical blockage, or a combination thereof, where identifying the physical blockage is based on the one or more parameters.

In some examples, to support obtaining the frame data, the frame data manager 625 may be configured as or otherwise support a means for obtaining the frame data in accordance with a rate, where the frame data includes an image obtained by the one or more cameras.

In some example, the base station location determination manager 645 may be configured as or otherwise support a means for determining a base station location of a base station in communication with the UE, the base station location relative to a UE location of the UE, where identifying the physical blockage includes identifying that the physical blockage is between the UE location and the base station location.

In some examples, the 3D data manager 650 may be configured as or otherwise support a means for obtaining three-dimensional data from one or more sensors in accordance with a rate, the one or more sensors being six degree of freedom sensors of the UE and the three-dimensional data includes orientation data, location data, or both, where determining the base station location, identifying the physical blockage, or both, are based on the three-dimensional data.

In some examples, the physical blockage is a person, an object, or a combination thereof.

In some examples, the UE is associated with an extended reality device.

Figure 7:
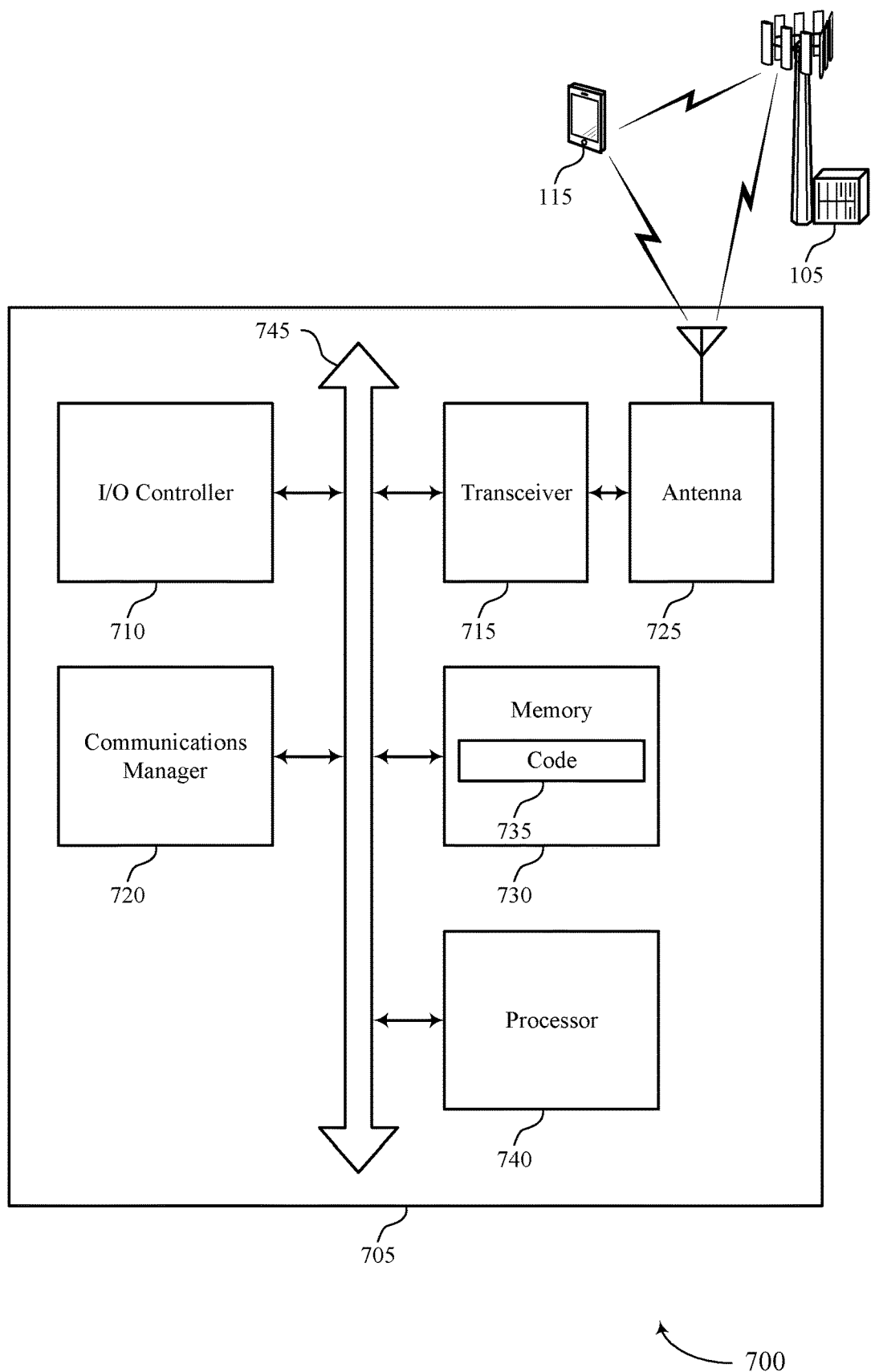
FIG. 7 shows a diagram of a system including a device that supports techniques for identifying blockages between devices in accordance with aspects of the present disclosure.

FIG. 7 shows a diagram of a system 700 including a device 705 that supports techniques for identifying blockages between devices in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for identifying blockages between devices). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for obtaining frame data from one or more cameras associated with the UE. The communications manager 720 may be configured as or otherwise support a means for determining a path of a beam providing communication between the UE and a base station. The communications manager 720 may be configured as or otherwise support a means for identifying, based at least in part on the frame data and the path of the beam, a physical blockage to the communication. The communications manager 720 may be configured as or otherwise support a means for performing beam management for the communication between the UE and the base station based on identifying the physical blockage.

By including or configuring the communications manager 720 in accordance with examples as described herein, the device 705 may support techniques for improved communication reliability, reduced latency, reduced power consumption, more efficient utilization of communication resources, and improved coordination between devices.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for identifying blockages between devices as described herein, or the processor 740 and the memory 730 may be otherwise configured to perform or support such operations.

Figure 8:
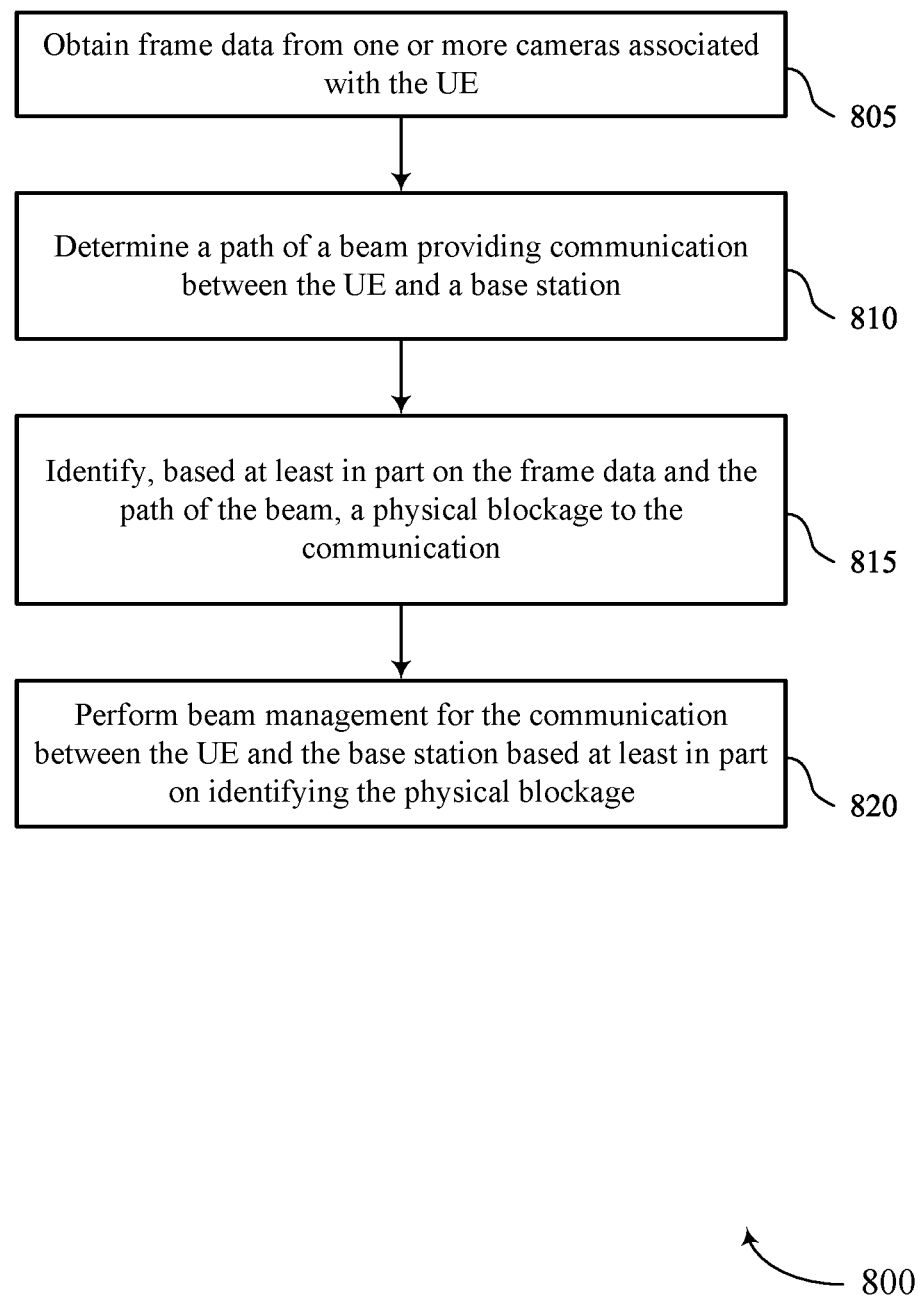
FIGS. 8 through 10 show flowcharts illustrating methods that support techniques for identifying blockages between devices in accordance with aspects of the present disclosure.

FIG. 8 shows a flowchart illustrating a method 800 that supports techniques for identifying blockages between devices in accordance with aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 805, the method may include obtaining frame data from one or more cameras associated with the UE. The operations of 805 may be performed in accordance with examples as disclosed herein. In some examples, aspects of the operations of 805 may be performed by a frame data manager 625 as described with reference to FIG. 6.

At 810, the method may include determining a path of a beam providing communication between the UE and a base station. The operations of 810 may be performed in accordance with examples as disclosed herein. In some examples, aspects of the operations of 810 may be performed by a path determination manager 630 as described with reference to FIG. 6.

At 815, the method may include identifying, based at least in part on the frame data and the path of the beam, a physical blockage to the communication. The operations of 815 may be performed in accordance with examples as disclosed herein. In some examples, aspects of the operations of 815 may be performed by a blockage identification manager 635 as described with reference to FIG. 6.

At 820, the method may include performing beam management for the communication between the UE and the base station based on identifying the physical blockage. The operations of 820 may be performed in accordance with examples as disclosed herein. In some examples, aspects of the operations of 820 may be performed by a beam management manager 640 as described with reference to FIG. 6.

Figure 9:
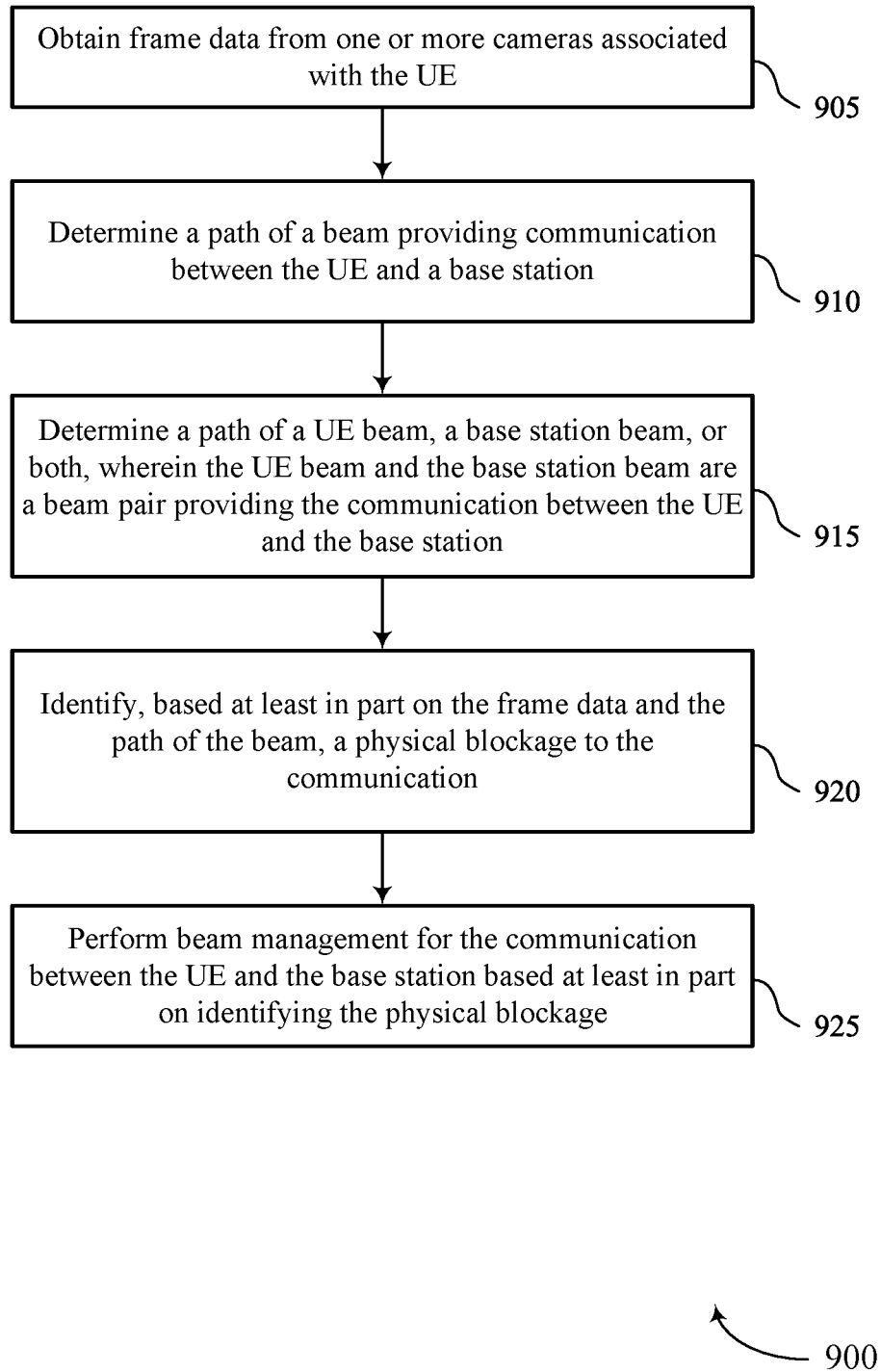

FIG. 9 shows a flowchart illustrating a method 900 that supports techniques for identifying blockages between devices in accordance with aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 905, the method may include obtaining frame data from one or more cameras associated with the UE. The operations of 905 may be performed in accordance with examples as disclosed herein. In some examples, aspects of the operations of 905 may be performed by a frame data manager 625 as described with reference to FIG. 6.

At 910, the method may include determining a path of a beam providing communication between the UE and a base station. The operations of 910 may be performed in accordance with examples as disclosed herein. In some examples, aspects of the operations of 910 may be performed by a path determination manager 630 as described with reference to FIG. 6.

At 915, the method may include determining a path of a UE beam, a base station beam, or both, where the UE beam and the base station beam are a beam pair providing the communication between the UE and the base station. The operations of 915 may be performed in accordance with examples as disclosed herein. In some examples, aspects of the operations of 915 may be performed by a path determination manager 630 as described with reference to FIG. 6.

At 920, the method may include identifying, based at least in part on the frame data and the path of the beam, a physical blockage to the communication. The operations of 920 may be performed in accordance with examples as disclosed herein. In some examples, aspects of the operations of 920 may be performed by a blockage identification manager 635 as described with reference to FIG. 6.

At 925, the method may include performing beam management for the communication between the UE and the base station based on identifying the physical blockage. The operations of 925 may be performed in accordance with examples as disclosed herein. In some examples, aspects of the operations of 925 may be performed by a beam management manager 640 as described with reference to FIG. 6.

Figure 10:
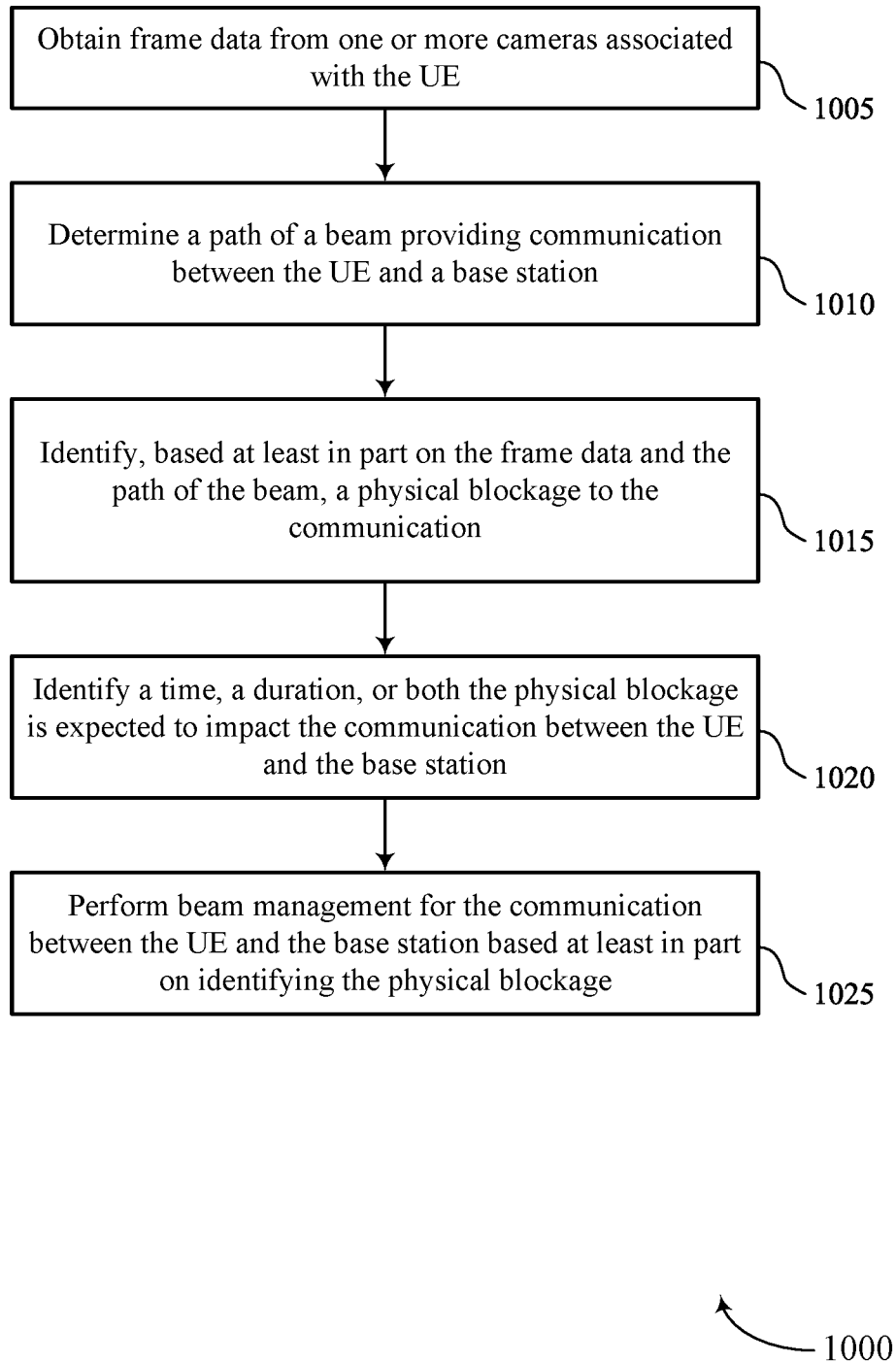

FIG. 10 shows a flowchart illustrating a method 1000 that supports techniques for identifying blockages between devices in accordance with aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1005, the method may include obtaining frame data from one or more cameras associated with the UE. The operations of 1005 may be performed in accordance with examples as disclosed herein. In some examples, aspects of the operations of 1005 may be performed by a frame data manager 625 as described with reference to FIG. 6.

At 1010, the method may include determining a path of a beam providing communication between the UE and a base station. The operations of 1010 may be performed in accordance with examples as disclosed herein. In some examples, aspects of the operations of 1010 may be performed by a path determination manager 630 as described with reference to FIG. 6.

At 1015, the method may include identifying, based at least in part on the frame data and the path of the beam, a physical blockage to the communication. The operations of 1015 may be performed in accordance with examples as disclosed herein. In some examples, aspects of the operations of 1015 may be performed by a blockage identification manager 635 as described with reference to FIG. 6.

At 1020, the method may include identifying a time, a duration, or both the physical blockage is expected to impact the communication between the UE and the base station. The operations of 1020 may be performed in accordance with examples as disclosed herein. In some examples, aspects of the operations of 1020 may be performed by a blockage identification manager 635 as described with reference to FIG. 6.

At 1025, the method may include performing beam management for the communication between the UE and the base station based on identifying the physical blockage. The operations of 1025 may be performed in accordance with examples as disclosed herein. In some examples, aspects of the operations of 1025 may be performed by a beam management manager 640 as described with reference to FIG. 6.

The following provides an overview of aspects of the present disclosure:

Aspect 1: A method for wireless communications at a UE, comprising: obtaining frame data from one or more cameras associated with the UE; determining a path of a beam providing communication between the UE and a base station; identifying, based at least in part on the frame data and the path of the beam, a physical blockage to the communication; and performing beam management for the communication between the UE and the base station based at least in part on identifying the physical blockage.

Aspect 2: The method of aspect 1, wherein determining the path of the beam further comprises: determining a path of a UE beam, a base station beam, or both, wherein the UE beam and the base station beam are a beam pair providing the communication between the UE and the base station.

Aspect 3: The method of aspect 2, wherein identifying the physical blockage further comprises: identifying that the physical blockage impacts the UE beam, the base station beam, or both based at least in part on determining the path of the UE beam, the base station beam, or both.

Aspect 4: The method of any of aspects 2 through 3, further comprising: locating the path of the UE beam, the base station beam, or both on the frame data from the one or more cameras associated with the UE, wherein identifying the physical blockage is based at least in part on locating the paths on the frame data.

Aspect 5: The method of any of aspects 2 through 4, wherein determining the path of the UE beam, the base station beam, or both is based at least in part on a beam codebook of the UE.

Aspect 6: The method of any of aspects 1 through 5, wherein identifying the physical blockage further comprises: identifying the physical blockage between a line-of-sight path, or a non-line-of-sight path between the UE and the base station.

Aspect 7: The method of any of aspects 1 through 6, wherein performing beam management further comprises: identifying that the physical blockage impacts a first beam pair of the UE and the base station; and switching to a second beam pair of the UE and the base station, wherein the second beam pair is clear of the physical blockage.

Aspect 8: The method of aspect 7, wherein switching to the second beam pair further comprises: performing measurements of one or more beam pairs, wherein the one or more beam pairs comprise wide beams, or beams associated with a set of phasers, or a combination thereof based at least in part on the physical blockage.

Aspect 9: The method of any of aspects 7 through 8, further comprising: switching back to the first beam pair upon determining that the first beam pair is clear of the physical blockage.

Aspect 10: The method of any of aspects 7 through 9, further comprising: comparing an area associated with the physical blockage to a threshold associated with the first beam pair, wherein switching to the second beam pair is based at least in part on the area associated with the physical blockage being greater than the threshold.

Aspect 11: The method of any of aspects 1 through 10, wherein identifying the physical blockage further comprises: identifying the physical blockage as a potential blockage before the physical blockage impacts the communication, wherein the UE performs beam management before the physical blockage impacts the communication.

Aspect 12: The method of any of aspects 1 through 11, further comprising: identifying a time, a duration, or both the physical blockage is expected to impact the communication.

Aspect 13: The method of any of aspects 1 through 12, further comprising: identifying one or more parameters of the physical blockage, the one or more parameters comprising a location of the physical blockage, a size of the physical blockage, a direction the physical blockage is moving, a velocity of the physical blockage, or a combination thereof, wherein identifying the physical blockage is based at least in part on the one or more parameters.

Aspect 14: The method of any of aspects 1 through 13, wherein obtaining the frame data further comprises: obtaining the frame data in accordance with a rate, wherein the frame data comprises an image obtained by the one or more cameras.

Aspect 15: The method of any of aspects 1 through 14, further comprising: determining a base station location of the base station in communication with the UE, the base station location relative to a UE location of the UE, wherein identifying the physical blockage comprises identifying that the physical blockage is between the UE location and the base station location.

Aspect 16: The method of aspect 15, further comprising: obtaining three-dimensional data from one or more sensors in accordance with a rate, the one or more sensors being six degree of freedom sensors of the UE and the three-dimensional data comprises orientation data, location data, or both, wherein determining the base station location, identifying the physical blockage, or both, are based at least in part on the three-dimensional data.

Aspect 17: The method of any of aspects 1 through 16, wherein the physical blockage is a person, an object, or a combination thereof.

Aspect 18: The method of any of aspects 1 through 17, wherein the UE is associated with an extended reality device.

Aspect 19: An apparatus for wireless communications at a UE, comprising a processor; memory coupled with the processor; and instructions stored in the memory and executable by the processor to cause the apparatus to perform a method of any of aspects 1 through 18.

Aspect 20: An apparatus for wireless communications at a UE, comprising at least one means for performing a method of any of aspects 1 through 18.

Aspect 21: A non-transitory computer-readable medium storing code for wireless communications at a UE, the code comprising instructions executable by a processor to perform a method of any of aspects 1 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    obtaining frame data from one or more cameras associated with the UE;
    determining a path of a beam providing communication between the UE and a base station;
    identifying, based at least in part on the frame data, a physical blockage to the communication; and
    performing beam management for the communication between the UE and the base station based at least in part on a comparison of an area associated with the physical blockage to a threshold associated with the beam, wherein performing beam management comprises switching the beam.

2. The method of claim 1, wherein determining the path of the beam further comprises:
    determining a path of a UE beam, a base station beam, or both, wherein the UE beam and the base station beam are a beam pair providing the communication between the UE and the base station.

3. The method of claim 2, wherein identifying the physical blockage further comprises:
    identifying that the physical blockage impacts the UE beam, the base station beam, or both based at least in part on determining the path of the UE beam, the base station beam, or both.

4. The method of claim 2, further comprising:
    locating the path of the UE beam, the base station beam, or both on the frame data from the one or more cameras associated with the UE, wherein identifying the physical blockage is based at least in part on locating the paths on the frame data.

5. The method of claim 2, wherein determining the path of the UE beam, the base station beam, or both is based at least in part on a beam codebook of the UE.

6. The method of claim 1, wherein identifying the physical blockage further comprises:
    identifying the physical blockage between a line-of-sight path, or a non-line-of-sight path, between the UE and the base station.

7. The method of claim 1, wherein performing beam management further comprises identifying that the physical blockage impacts a first beam pair of the UE and the base station, and wherein switching the beam comprises switching to a second beam pair of the UE and the base station, wherein the second beam pair is clear of the physical blockage.

8. The method of claim 7, wherein switching to the second beam pair further comprises:
    performing measurements of one or more beam pairs, wherein the one or more beam pairs comprise wide beams, or beams associated with a set of phasers, or a combination thereof based at least in part on the physical blockage.

9. The method of claim 7, further comprising:
    switching back to the first beam pair upon determining that the first beam pair is clear of the physical blockage.

10. The method of claim 7, wherein switching to the second beam pair is based at least in part on the area associated with the physical blockage being greater than the threshold.

11. The method of claim 1, wherein identifying the physical blockage further comprises:
    identifying the physical blockage as a potential blockage before the physical blockage impacts the communication, wherein the UE performs beam management before the physical blockage impacts the communication.

12. The method of claim 1, further comprising:
    identifying a time, a duration, or both the physical blockage is expected to impact the communication.

13. The method of claim 1, further comprising:
    identifying one or more parameters of the physical blockage, the one or more parameters comprising a location of the physical blockage, a size of the physical blockage, a direction the physical blockage is moving, a velocity of the physical blockage, or a combination thereof, wherein identifying the physical blockage is based at least in part on the one or more parameters.

14. The method of claim 1, wherein obtaining the frame data further comprises:
    obtaining the frame data in accordance with a rate, wherein the frame data comprises an image obtained by the one or more cameras.

15. The method of claim 1, further comprising:
    determining a base station location of the base station in communication with the UE, the base station location relative to a UE location of the UE, wherein identifying the physical blockage comprises identifying that the physical blockage is between the UE location and the base station location.

16. The method of claim 15, further comprising:
    obtaining three-dimensional data from one or more sensors in accordance with a rate, the one or more sensors being six degree of freedom sensors of the UE and the three-dimensional data comprises orientation data, location data, or both, wherein determining the base station location, identifying the physical blockage, or both, are based at least in part on the three-dimensional data.

17. The method of claim 1, wherein the UE is associated with an extended reality device.

18. An apparatus for wireless communications at a user equipment (UE), comprising:
    a processor;
    memory coupled with the processor; and
    instructions stored in the memory and executable by the processor to cause the apparatus to:
        obtain frame data from one or more cameras associated with the UE;

determine a path of a beam providing communication between the UE and a base station;

identify, based at least in part on the frame data, a physical blockage to the communication; and perform beam management for the communication between the UE and the base station based at least in part on a comparison of an area associated with the physical blockage to a threshold associated with the beam, wherein the instructions to perform beam management are executable by the processor to cause the apparatus to switch the beam.

19. The apparatus of claim 18, wherein the instructions to determine the path of the beam are further executable by the processor to cause the apparatus to:

determine a path of a UE beam, a base station beam, or both, wherein the UE beam and the base station beam are a beam pair providing the communication between the UE and the base station.

20. The apparatus of claim 19, wherein the instructions to identify the physical blockage are further executable by the processor to cause the apparatus to:

identify that the physical blockage impacts the UE beam, the base station beam, or both based at least in part on determining the path of the UE beam, the base station beam, or both.

21. The apparatus of claim 19, wherein the instructions are further executable by the processor to cause the apparatus to:

locate the path of the UE beam, the base station beam, or both on the frame data from the one or more cameras associated with the UE, wherein identifying the physical blockage is based at least in part on locating the paths on the frame data.

22. The apparatus of claim 19, wherein determining the path of the UE beam, the base station beam, or both is based at least in part on a beam codebook of the UE.

23. The apparatus of claim 18, wherein the instructions are further executable by the processor to cause the apparatus to:

determine a base station location of the base station in communication with the UE, the base station location relative to a UE location of the UE, wherein identifying the physical blockage comprises identifying that the physical blockage is between the UE location and the base station location.

24. The apparatus of claim 18, wherein the instructions to identify the physical blockage are further executable by the processor to cause the apparatus to:

identify the physical blockage between a line-of-sight path, or a non-line-of-sight path, between the UE and the base station.

25. The apparatus of claim 18, wherein the instructions to perform beam management are further executable by the processor to cause the apparatus to:

identify that the physical blockage impacts a first beam pair of the UE and the base station; and switch to a second beam pair of the UE and the base station, wherein the second beam pair is clear of the physical blockage.

26. The apparatus of claim 18, wherein the instructions to identify the physical blockage are further executable by the processor to cause the apparatus to:

identify the physical blockage as a potential blockage before the physical blockage impacts the communication, wherein the UE performs beam management before the physical blockage impacts the communication.

27. The apparatus of claim 18, wherein the instructions are further executable by the processor to cause the apparatus to:

identify a time, a duration, or both the physical blockage is expected to impact the communication.

28. The apparatus of claim 18, wherein the instructions are further executable by the processor to cause the apparatus to:

identify one or more parameters of the physical blockage, the one or more parameters comprising a location of the physical blockage, a size of the physical blockage, a direction the physical blockage is moving, a velocity of the physical blockage, or a combination thereof, wherein identifying the physical blockage is based at least in part on the one or more parameters.

29. An apparatus for wireless communications at a user equipment (UE), comprising:

means for obtaining frame data from one or more cameras associated with the UE;

means for determining a path of a beam providing communication between the UE and a base station;

means for identifying, based at least in part on the frame data, a physical blockage to the communication; and means for performing beam management for the communication between the UE and the base station based at least in part on a comparison of an area associated with the physical blockage to a threshold associated with the beam, wherein the means for performing beam management comprises means for switching the beam.

30. A non-transitory computer-readable medium storing code for wireless communications at a user equipment (UE), the code comprising instructions executable by a processor to:

obtain frame data from one or more cameras associated with the UE;

determine a path of a beam providing communication between the UE and a base station;

identify, based at least in part on the frame data, a physical blockage to the communication; and perform beam management for the communication between the UE and the base station based at least in part on a comparison of an area associated with the physical blockage to a threshold associated with the beam, wherein the code comprises instructions executable by the processor to switch the beam.

* * * * *